United States Patent
Teo

(10) Patent No.: US 9,123,131 B2
(45) Date of Patent: Sep. 1, 2015

(54) PARALLEL CORRELATION METHOD AND CORRELATION APPARATUS USING THE SAME

(71) Applicant: PIXART IMAGING INC., Hsin-Chu (TW)

(72) Inventor: Wai Lian Teo, Pulau Pinang (MY)

(73) Assignee: PIXART IMAGING INC., Hsin-Chu (TW)

( * ) Notice: Subject to any disclaimer, the term of this patent is extended or adjusted under 35 U.S.C. 154(b) by 78 days.

(21) Appl. No.: 14/035,929

(22) Filed: Sep. 24, 2013

(65) Prior Publication Data

US 2015/0086082 A1 Mar. 26, 2015

(51) Int. Cl.
*G06K 9/20* (2006.01)
*G06T 7/20* (2006.01)
*G06F 3/03* (2006.01)

(52) U.S. Cl.
CPC .............. *G06T 7/20* (2013.01); *G06F 3/0304* (2013.01); *G06T 2207/10004* (2013.01)

(58) Field of Classification Search
CPC .......... G06K 9/32; G06K 9/6211; G06T 1/20; G06T 7/0075; H04N 13/011; H04N 13/0081; H04N 13/0051; H04N 13/0055; H04N 13/0059; H04N 13/0239; H04N 13/0246; H04N 13/0296

USPC .................. 382/276, 278, 312, 321
See application file for complete search history.

(56) References Cited

U.S. PATENT DOCUMENTS

| | | | |
|---|---|---|---|
| 6,097,851 A | 8/2000 | Anderson | |
| 6,215,898 B1 * | 4/2001 | Woodfill et al. | 382/154 |
| 6,373,994 B1 | 4/2002 | Anderson | |
| 7,315,013 B2 | 1/2008 | Siah | |
| 7,565,034 B2 | 7/2009 | Siah | |
| 2003/0058218 A1 * | 3/2003 | Crane et al. | 345/158 |

* cited by examiner

*Primary Examiner* — Ali Bayat
(74) *Attorney, Agent, or Firm* — Li & Cai Intellectual Property (USA) Office

(57) ABSTRACT

A parallel correlation method and a correlation apparatus are provided, which can be adapted for an optical navigation device. The method includes: generating a reference array corresponding to a reference image and a compare array corresponding to a first compare image captured are generated; storing the reference array in a first memory bank such that the reference pixel values of an ith column thereof are indexed by the respective ith column; storing the compare array in a second memory bank such that the compare pixel values of a jth column thereof are indexed by the respective jth column; fetching the compare pixel values from the second memory bank and the corresponding reference pixel values with column indexing to simultaneously compute the correlation between the reference array and the compare array for a L×M correlation array, wherein M, i, and j are integers.

19 Claims, 7 Drawing Sheets

| memory address | memory data | | | | | | | |
|---|---|---|---|---|---|---|---|---|
| RX[X] | RY[Y] | RY[Y+1] | RY[Y+2] | RY[Y+3] | RY[Y+4] | RY[Y+5] | RY[Y+6] | ... RY[Y+N] |
| RX[X+1] | RY[Y] | RY[Y+1] | RY[Y+2] | RY[Y+3] | RY[Y+4] | RY[Y+5] | RY[Y+6] | ... RY[Y+N] |
| RX[X+2] | RY[Y] | RY[Y+1] | RY[Y+2] | RY[Y+3] | RY[Y+4] | RY[Y+5] | RY[Y+6] | ... RY[Y+N] |
| RX[X+3] | RY[Y] | RY[Y+1] | RY[Y+2] | RY[Y+3] | RY[Y+4] | RY[Y+5] | RY[Y+6] | ... RY[Y+N] |
| RX[X+4] | RY[Y] | RY[Y+1] | RY[Y+2] | RY[Y+3] | RY[Y+4] | RY[Y+5] | RY[Y+6] | ... RY[Y+N] |
| RX[X+5] | RY[Y] | RY[Y+1] | RY[Y+2] | RY[Y+3] | RY[Y+4] | RY[Y+5] | RY[Y+6] | ... RY[Y+N] |
| RX[X+6] | RY[Y] | RY[Y+1] | RY[Y+2] | RY[Y+3] | RY[Y+4] | RY[Y+5] | RY[Y+6] | ... RY[Y+N] |
| RX[X+7] | RY[Y] | RY[Y+1] | RY[Y+2] | RY[Y+3] | RY[Y+4] | RY[Y+5] | RY[Y+6] | ... RY[Y+N] |
| ...... | | | | ...... | | | | |
| RX[X+N] | | RY[Y+1] | RY[Y+2] | RY[Y+3] | RY[Y+4] | RY[Y+5] | RY[Y+6] | ... RY[Y+N] |

FIG.2A

| memory address | memory data | | | | | | | |
| --- | --- | --- | --- | --- | --- | --- | --- | --- |
| CX[X] | CY[Y] | CY[Y+1] | CY[Y+2] | CY[Y+3] | CY[Y+4] | CY[Y+5] | CY[Y+6] | ... CY[Y+N] |
| CX[X+1] | CY[Y] | CY[Y+1] | CY[Y+2] | CY[Y+3] | CY[Y+4] | CY[Y+5] | CY[Y+6] | ... CY[Y+N] |
| CX[X+2] | CY[Y] | CY[Y+1] | CY[Y+2] | CY[Y+3] | CY[Y+4] | CY[Y+5] | CY[Y+6] | ... CY[Y+N] |
| CX[X+3] | CY[Y] | CY[Y+1] | CY[Y+2] | CY[Y+3] | CY[Y+4] | CY[Y+5] | CY[Y+6] | ... CY[Y+N] |
| CX[X+4] | CY[Y] | CY[Y+1] | CY[Y+2] | CY[Y+3] | CY[Y+4] | CY[Y+5] | CY[Y+6] | ... CY[Y+N] |
| CX[X+5] | CY[Y] | CY[Y+1] | CY[Y+2] | CY[Y+3] | CY[Y+4] | CY[Y+5] | CY[Y+6] | ... CY[Y+N] |
| CX[X+6] | CY[Y] | CY[Y+1] | CY[Y+2] | CY[Y+3] | CY[Y+4] | CY[Y+5] | CY[Y+6] | ... CY[Y+N] |
| CX[X+7] | CY[Y] | CY[Y+1] | CY[Y+2] | CY[Y+3] | CY[Y+4] | CY[Y+5] | CY[Y+6] | ... CY[Y+N] |
| ...... | | | | ...... | | | | |
| CX[X+N] | | CY[Y+1] | CY[Y+2] | CY[Y+3] | CY[Y+4] | CY[Y+5] | CY[Y+6] | CY[Y+N] |

FIG.2B

PARALLEL CORRELATION METHOD AND CORRELATION APPARATUS USING THE SAME

BACKGROUND

1. Technical Field

The present disclosure relates to a correlation method of an optical navigation device, in particular, to a parallel correlation method for an optical navigation device and a correlation apparatus using the same.

2. Description of Related Art

Optical navigation devices (such as optical mouse) operate by constantly tracking the relative displacement and velocity of the optical device using a plurality of sequentially captured images. A conventional navigation method of optical navigation devices uses a laser-generated light that reflects off a working surface to a light detector. The light detector includes, for example, a complementary metal-oxide semiconductor (CMOS) image sensor array. The reflection of the light produces a pattern of speckle that is captured by the CMOS image sensor array. As the optical navigation device is moved across the working surface or as the working surface is moved past the optical navigation device, successive images are rapidly captured and compared to determine the amount of displacement based on the location of the pattern of speckle.

Correlation technique has been often adopted in optical navigation method for aligning similar features between successive images i.e., a reference image and an input image (e.g., a compare image) captured sequent to the reference image, so as to determine the relative motion (e.g., the relative displacement and direction) of the optical navigation device with respect to the working surface. Specifically, the correlation technique compares and correlates the reference image and the compare image on a pixel by pixel basis using a two-dimensional cross-correlation.

Currently, the correlation technique is commonly implement by serial correlation algorithm, in which the compare image is fixed in position while the reference image is repeatedly shifted pixel by pixel within a predefined size of search window (such as 3×3 or 5×5 search window). Under serial correlation architecture, each column of the correlation window are sequentially computed through repeatedly correlating the pixel of the reference image tagged in the row with the corresponding pixel of the compare image until all the rows within the search window has been correlated. Subsequently, a peak correlation value or a least correlation value is determined from the correlation result depend upon the correlation function adopted to identify the feature (i.e., the light pattern) in the compare image and compute the displacement information therefrom.

As known to those skilled in the art, any image captured by the optical navigation device is first filtered and stored in the memory. Thus, in process of computing each column of the correlation window under serial correlation architecture, the corresponding pixels of the reference image and the compare image are constantly fetched from memory and then correlated. For instance, at least 25 times correlations must be processed before obtaining a correlation result for a 5×5 search window, and the memory therefore is accessed 25 times for acquiring the associated correlation data. Moreover, the calculation for next column doesn't start until the previous column has been computed.

Accordingly, there is quite amount of computational time (i.e., several clock cycles) required in each tracking operation for computing the displacement of the optical navigation device after capturing an image, of which much of the computation time are used in preparing the associated correlation data from memory. The computational time required herein also increase with the size of the search window i.e., the larger the search window the longer computational time, which draws limitations to the tradeoffs between accuracy and the tracking speed. Additionally, when the optical navigation device operates at high frame rate, latency might be generated and affect the overall tracking performance of the optical navigation device.

SUMMARY

Accordingly, exemplary embodiments of the present disclosure provide a parallel correlation method and a correlation apparatus for an optical navigation device, in which the column pixel values of an image are indexed by the corresponding column such that the correlation between the compare image and the reference image over a selected search window size can be processed simultaneously. Thus, the tracking efficiency can be greatly improved while attaining the require tracking accuracy.

An exemplary embodiment of the present disclosure provides a parallel correlation method, which can be adapted for an optical navigation device such as an optical mouse, an optical joystick. The parallel correlation method includes the following steps. A compare array corresponding to a first compare image and a reference array corresponding to a reference image are respectively generated. The reference array is stored in a first memory bank in a manner that the reference pixel values of an ith column are indexed by the ith column. The compare array is stored in a second memory bank in a manner that the compare pixel values of a jth column are indexed by a jth column thereof. Next, the compare pixel values from the second memory bank and the reference pixel values from the first memory bank are fetched with column indexing to simultaneously compute the correlation between the reference array and the compare array for a L×M correlation array, wherein each correlation value in the L×M correlation array corresponds to an indexing movement of the reference array over the compare array.

According to one exemplary embodiment of the present disclosure, the method further comprising: fetching the compare pixel values from the second memory bank and the reference pixel values respectively from the first memory bank to define a L×M search window, wherein the L×M search window corresponds to the indexing movement of the reference array over the compare array; computing a correlation value for the compare pixel value and the corresponding reference pixel value tagged in the L×M search window; repeating the steps of defining a L×M search window and correlating the compare array and reference array to generate the L×M correlation array. Wherein, L, M, i, and j are integers According to one exemplary embodiment of the present disclosure, comprising of analyzing the L×M correlation array to identify a peak correlation value thereof based on a predetermined criterion.

According to one exemplary embodiment of the present disclosure, comprising of determining a displacement of the optical navigation device based on the pixel position associated with the peak correlation value identified.

Another exemplary embodiment of the present disclosure provides a correlation apparatus, which is adapted for an optical navigation device. The correlation apparatus includes a first memory bank, a second memory bank, a parallel cell array, and a navigation engine processing unit. The first memory bank is configured for storing a reference array corresponding to a reference image, wherein the reference pixel values of an ith column of the reference array are indexed by the ith column. In which, i is an integer. The second memory bank is configured for storing a compare array corresponding to a first compare image captured, wherein the compare pixel values of a jth column of the compare array are indexed by the jth column thereof, wherein, j is an integer. The parallel cell array has a plurality of cells. The parallel cell array is coupled between the first memory bank and the second memory bank. Each of the cells operatively receives the compare pixel values indexed from the second memory bank and the reference pixel values tagged concurrently fed from the first memory bank and correlating the reference pixel values tagged concurrently fed from the first memory bank to the compare pixel values overlaid thereon so as to generate a correlation value. The navigation engine processing unit is coupled to the parallel cell array, the first memory bank, and the second memory bank. The navigation engine processing unit operatively drives the first memory bank and the second memory bank to correspondingly output the compare pixel values and the reference pixel values to the plurality of cells of the parallel cell array. The navigation engine processing unit further analyzes the correlation values generated for the plurality of cells of the parallel cell array so as to identify a peak correlation value based on a predetermined criterion. The navigation processing unit further determines a displacement of the optical navigation device based on the location of the peak correlation value identified in the compare array.

According to one exemplary embodiment of the present disclosure, the correlation apparatus further includes a shift register, which is coupled between the first memory bank and the plurality of cells. The correlation apparatus shifts the reference pixel values from the xth column cells to the x+1th column cells to facilitate the correlation computation of the M×M correlation window, wherein x is an integer.

An exemplary embodiment of the present disclosure provides an optical navigation device, and the optical navigation device includes a control unit, an image sensor, a light source, an aforementioned correlation apparatus, and a communication unit. The image sensor, the light source, the correlation apparatus, and the communication unit are respectively coupled to the control unit. The light source is configured for illuminating a working surface of the optical navigation device. The image sensor is configured for capturing a plurality of images responsive to a reflected light of the working surface to generate a plurality of images according to a predetermined frame rate. The control unit controls the operation of the correlation apparatus to compute the displacement of the optical navigation device upon receiving a successive image. The control unit further controls the communication unit to transmit the displacement to an electronic device for controlling a movement of cursor on the electronic device.

To sum up, the present disclosure provides a parallel correlation method and a correlation apparatus using the same, which through utilizing a parallel correlation algorithm accompany with setting each column of the image array as memory address can simultaneously compute correlation over a predefined search window thereby increases tracking speed and the tracking performance of the optical navigation device. Accordingly, using the parallel correlation method, faster framer rate can be achieved with no latency in tracking operation while attain the required tracking accuracy.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 2A is a diagram of a memory bank storing the reference array provided in accordance with an exemplary embodiment of the present disclosure.

FIG. 2B is a diagram of a memory bank storing the compare array provided in accordance with an exemplary embodiment of the present disclosure.

DESCRIPTION OF THE EXEMPLARY EMBODIMENTS

Figure 1:
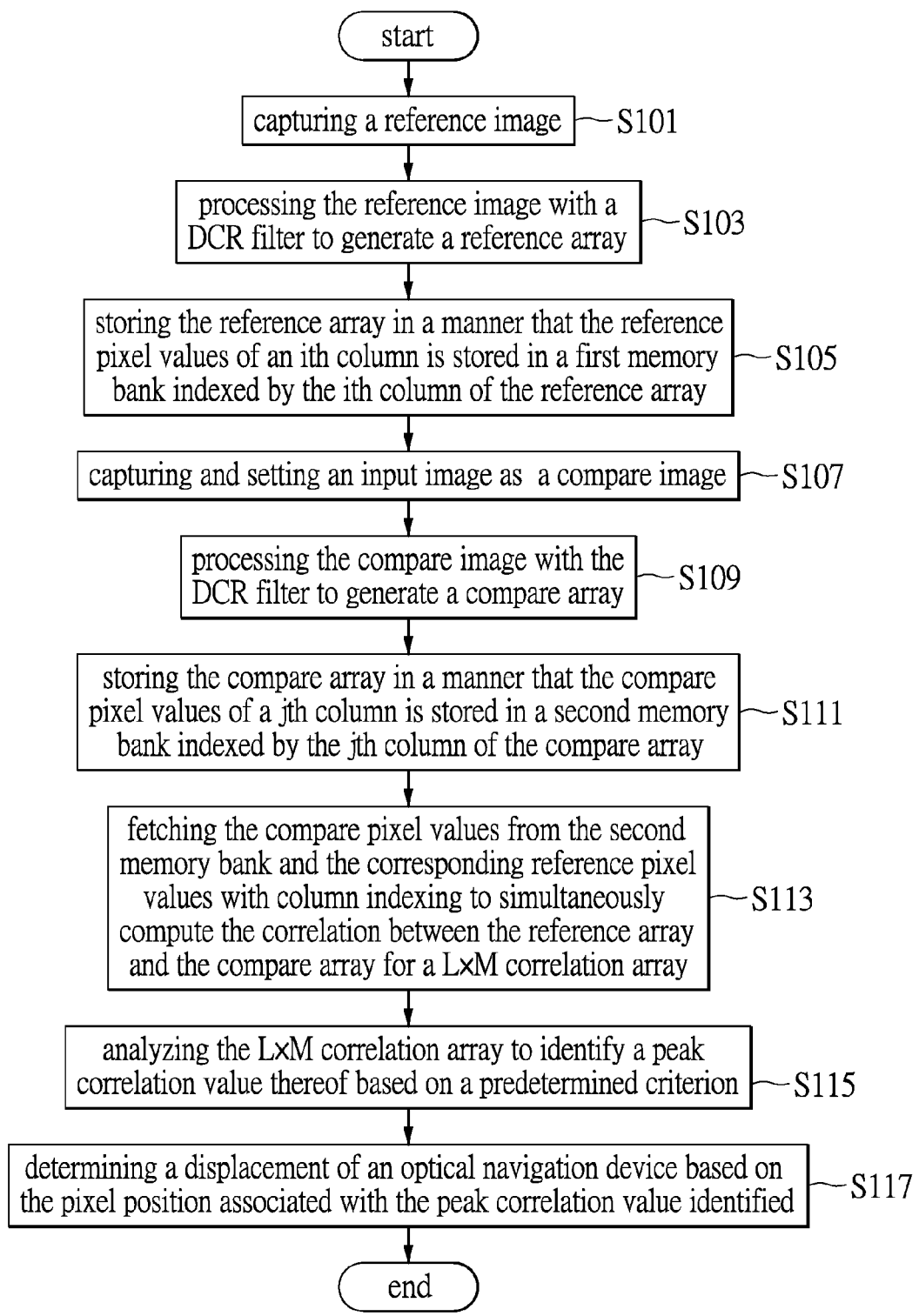
FIG. 1 is a flowchart diagram of a parallel correlation method provided in accordance to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

The parallel correlation method of present disclosure simultaneously incorporates serial and parallel correlation algorithms for performing image comparison between the compare image and the reference image to quickly locate a peak correlation value with a search window defined in the compare image and compute the displacement information of the optical navigation device. The correlation processing time can be effectively shortened thereby increase the tracking speed and the overall operational performance of the optical navigation device.

Please refer to FIG. 1, which shows a flowchart diagram illustrating a parallel correlation method provided in accordance to an exemplary embodiment of the present disclosure. The parallel correlation method can be utilized in a tracking operation for an optical navigation device such as an optical mouse or an optical joystick. The optical navigation device may be wired or wirelessly connected to an electronic device (such as a computer, a laptop, or a mobile phone) to control a cursor operation on the electronic device.

Initially in Step S101, the optical navigation device operatively captures a reference image (e.g., a first image) with an image sensor equipped therein. The optical navigation device subsequently processing the reference image with a digital image contour removal (DCR) filter to generate a reference array in Step S103.

In Step S105, the optical navigation device stores the reference array in a first memory bank of a memory unit therein. The reference pixel values of an ith column in the reference array are indexed by the respective ith column, wherein i is an integer and ranges from 0 to the maximum column number of the reference array-1. In other words, the reference pixel values in each column of the reference array are indexed correspondingly by the respective column of the reference array. For instance, an N×N reference array is divided into N N×1 sub-arrays, and N×1 sub-arrays are respectively stored in the first memory bank indexed by the corresponding column index of the reference array.

Incidentally, the DCR filter is utilized to remove the detected digital contours in any raw image (e.g., the input image) captured by the image sensor to smooth the image and filter out unwanted noise so as to ensure the noise generated by the image sensor would not affect the analyzation of the image. The DCR filtering may be implemented by a low pass filter having a mask window size matches the selected search window (such as 18 by 18) to remove the detected digital image contours. Particularly, the digital image contours may be detected by determining a variance within the search window and comparing the variance to a threshold value for the selected search window size, wherein the threshold may be adjusted according to the image brightness or the ambient light detected.

In Step S107, the optical navigation device operatively captures and sets a newly inputted image as a compare image. The compare image is captured subsequent to the reference image. The compare image is captured at a predetermined frame rate, which may be configured according to the operational environment of the optical navigation device such as the ambient light, the sensitive level of the image sensor, and the moving speed of the optical navigation device. In Step S109, the optical navigation device processes the compare image with the DCR filter to generate a compare array in Step S109. The compare array in the instant embodiment has the same dimension as the reference array.

In Step S111, the optical navigation device stores the compare array in a second memory bank of a memory unit therein. Specifically, the compare pixel values of a jth column in the compare array are indexed by the respective jth column, wherein j is an integer and ranges from 0 to the maximum column number of the compare array-1. In other words, the compare pixel values in each column of the compare array are indexed by the corresponding column of the compare array. For instance, an N×N compare array is divided into N N×1 sub-arrays, and N×1 sub-arrays are respectively stored in the second memory bank indexed by the corresponding column index of the compare array.

The optical navigation device further computes the correlation between the compare array and the reference array over a L×M search window (e.g., a 5×5 search window or a 7×7 search window) to identify a feature e.g., a light pattern from the compare array to determine the displacement of the optical navigation device.

In Step S113, the optical navigation device fetches the compare pixel values of the compare array from the second memory bank and the reference pixel values of the reference array from the first memory bank with column indexing to simultaneously compute the correlation between the reference array and the compare array for a L×M correlation array, wherein each correlation value in the L×M correlation array corresponds to an indexing movement of the reference array over the compare array.

More specifically, the optical navigation device fetches the reference pixel values of the reference array tagged in a L×M search window from the first memory bank and the compare pixel values of the compare array tagged in the L×M search window from the second memory bank overlaid thereon, wherein L, M are integers. The movement of the L×M search window corresponds to an indexing movement of the reference array over the compare array.

The optical navigation device subsequently computes a correlation value between the compare array and the reference array over the L×M search window. The reference array is then moved pixel by pixel and overlaid onto each possible compare pixel values of the compare array defining all other possible L×M search windows so as to compare all the compare pixel values in the compare array with the reference array. The correlation value in the instant embodiment is computed by summation of the multiplication result between each compare pixel value and each corresponding reference pixel value tagged in the L×M search window a, accordingly.

In one embodiment, the L×M search window may be centered on the pixel location of the compare array where the reference array completely overlaps the compare array. In another embodiment, the L×M search window may be centered on a pixel location of the compare array where peak correlation value is previously occurred.

Next in Step S115, the optical navigation device analyzes the L×M correlation array to identify a peak correlation value thereof based on a predetermined criterion e.g., greater than a correlation threshold. For instance, the optical navigation device may compare correlation values of the L×M correlation array with the correlation threshold to identify the peak correlation value. In another embodiment, the optical navigation device may just compare correlation values in the L×M correlation array to identify the peak correlation value. The optical navigation device subsequently determines a displacement (e.g. displacement vector) based on the pixel position associated the peak correlation value identified. (Step S117) The displacement herein represents the amount of distance of which the optical navigation device has moved across the working surface. The optical navigation device further may transmit the displacement to the electronic device for controlling the operation of the cursor.

Additionally, the optical navigation device can selectively store the newly captured input image in the first memory bank or the second memory bank. Specifically, whenever the optical navigation device captures any input image as the compare image, the optical navigation device determines whether to update the reference array with the previous compare array. In one embodiment, the optical navigation device may determine whether to use the compare array as the new reference array or to keep the reference array unchanged according to the correlation results. Particularly, when the optical navigation device determines to continue comparing the newly capture image with the present reference array, the optical navigation device may erase the memory data in the second memory bank and store the newly captured compare image, accordingly; when the optical navigation device determines to update the reference array, the optical navigation device may configured the current compare array as the reference array and update the reference array with the newly captured compare image.

For instance, when the optical navigation device determines that the displacement of the optical navigation device is very small indicating not much have changed between the compare image and the reference image, the optical navigation device may decide to keep the reference array unchanged. For another instance, when the optical navigation device determines that the displacement of the optical navigation device is very large indicating the optical navigation device has been moved greatly, the optical navigation device may decide to update the reference array.

Moreover, the optical navigation device may further determine a predefined indexing movement of the reference array over the compare array based on location of the peak correlation value previously identified in the compare image. The optical navigation device may compute the correlation between the compare array and the reference array over a specific region and generate the L×M correlation array for the specific region, wherein the specific region is formed centering on the location of the peak correlation value computed previously. The optical navigation device fetches the corresponding compare pixel values and the reference pixel values according to the predefined indexing movement.

In one embodiment, the optical navigation device can further compare the location of the peak correlation value previously identified and the location of the peak correlation value presently identified to decide the predefine indexing movement for the incoming input image captured.

To put in more concretely, FIGS. 2A and 2B depict an implementation describing the array storing algorithm adopted by the optical navigation device for storing the reference array and the compare array. Specifically, FIG. 2A shows a diagram illustrating a first memory bank for storing reference array provided in accordance to an exemplary embodiment of the present disclosure. FIG. 2B shows a diagram of a second memory bank for storing compare array provided in accordance to an exemplary embodiment of the present disclosure.

In the instant embodiment, an N×N reference array and an N×N compare array are illustrated. RX[X]~RX[X+N] represent memory addresses in the first memory bank, and RY[Y]~RY[Y+N] represent the reference pixel values of each column of the reference array. RX[X]~RX[X+N] are respectively used for indexing each of the multiple sets of the memory data RY[Y]~RY[Y+N]. CX[X]~CX[X+N] represent memory addresses in the second memory bank and CY[Y]~CY[Y+N] represent the compare pixel values of each column in the compare array. CX[X]~CX[X+N] are respectively used for indexing each of the multiple sets of the memory data CY[Y]~CY[Y+N]. X and Y herein represent. Additionally, by using the memory address offsets X and Y, corresponding section of the reference array or the compare array can be accurately and quickly accessed Taking an 18×18 reference array as an example, the reference pixel values of the first column of the reference array stored in the first memory bank as RY[Y]~RY[Y+17] addressed by RX[X]; the reference pixel values of the second column of the reference array stored in the first memory bank as RY[Y]~RY[Y+17] addressed by RX[X+1]; the reference pixel values of the eighteenth column of the reference array stored in the first memory bank as RY[Y]~RY[Y+17] addressed by RX[X+17]. Each column of reference array can be fetched as a bit stream i.e., RY[Y]~RY[Y+17] are fetched as a bit stream, wherein the length of the bit stream is determine by the number of bits per pixel and the number of pixel per bit stream. For instance, suppose that each reference pixel value is represented with three bits then for an 18×18 reference array, each column is represented by 54 bits. Such that through truncating and decoding the bit stream, corresponding correlation pixel values of reference array can be obtained.

Figure 3:
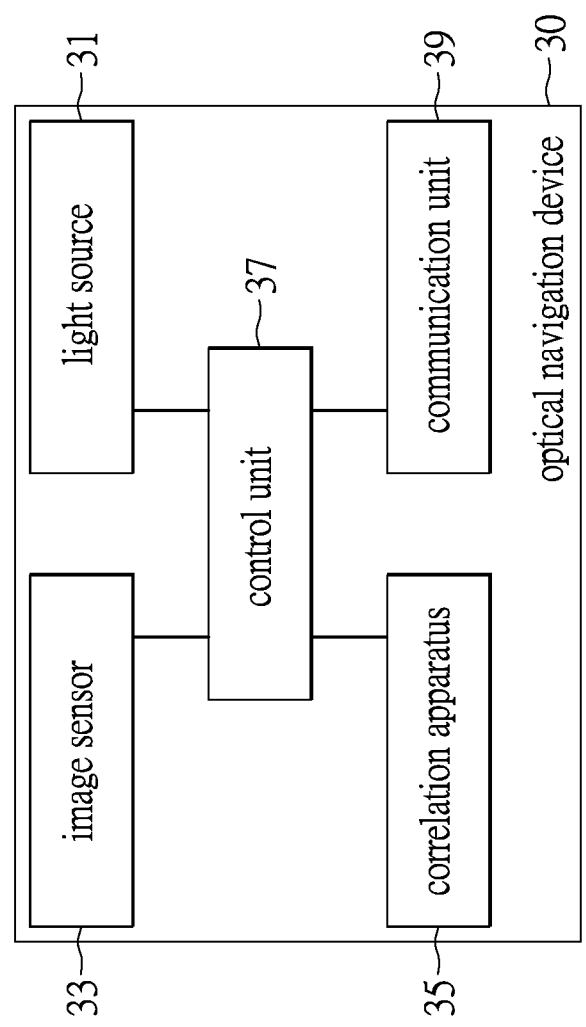
FIG. 3 is a block diagram of an optical navigation device provided in accordance to an exemplary embodiment of the present disclosure.

As described previously, the parallel correlation method can be implemented by the optical navigation device. For more detailed elaboration on the parallel correlation method, the present disclosure further provides an implementation of the optical navigation device. Please refer to FIG. 3, which shows a diagram illustrating an optical navigation device provided in accordance to an exemplary of embodiment. The optical navigation device 30 includes a light source 31, an image sensor 33, a correlation apparatus 35, a control unit 35, and a communication unit 39. The image sensor 33, the light source 35, the correlation apparatus 35, and the communication unit 39 are respectively coupled to the control unit 37. The control unit 37 operatively controls the operations of the light source 31, the image sensor 33, the correlation apparatus 35, and the communication unit 39.

The light source 31 is configured for illuminating a working surface (e.g., a mouse pad, a desktop, or a glass) of the optical navigation device 30. The light source 31. The light source 31 may be implemented by a light-emitting diode or a laser diode. Moreover, in the instant embodiment, the light source 31 comprises of an array of light emitting diodes. However, in practice, the light source 31 may comprise of one or more light emitting diodes depends upon actual operational requirement, and the present disclosure is not limited thereto.

The image sensor 33 is configured for capturing a plurality of images responsive to a reflected light of the working surface to sequentially generate a plurality of images according to the predetermined frame rate. The predetermined frame rate may be configured based upon the operational environment of the optical navigation device 30 such as condition of the working surface, the moving speed of the optical navigation device 30, and the present disclosure is not limited thereto.

The image sensor 33 may be implemented by a charge-coupled device (CCD) image sensor or a complementary metal oxide semiconductor (CMOS) sensor. Those skilled in the art should be able to design according to actual operational application and the instant embodiment is not limited thereto.

The correlation apparatus 35 is configured to store the reference array corresponding to the reference image and stores the compare array corresponding to the compare image. The correlation apparatus 35 is configured to operatively correlate the compare array and the reference array using the parallel correlation method and analyze the correlation values of the L×M correlation array generated so as to identify a peak correlation value based on the predetermined criterion (e.g., a predetermined threshold). The correlation apparatus 35 subsequently analyzes a movement or a displacement of the optical input device 30 based on the peak correlation value identified.

The control unit 37 is the operation core of the optical input device 30. The control unit 37 operatively implements the DCR filter to filter the removed the unwanted noise from the images captured to generate the reference array and the compare array respectively for the correlation apparatus 35. So that the correlation apparatus 35 can accurately compare variation between the image captured to generate the relative displacement of optical navigation device. The control unit 37 controls the communication unit 39 to transmit the displacement to the electronic device in a wired or a wirelessly manner so as to correspondingly control the movement of the cursor displayed thereon.

Figure 4:
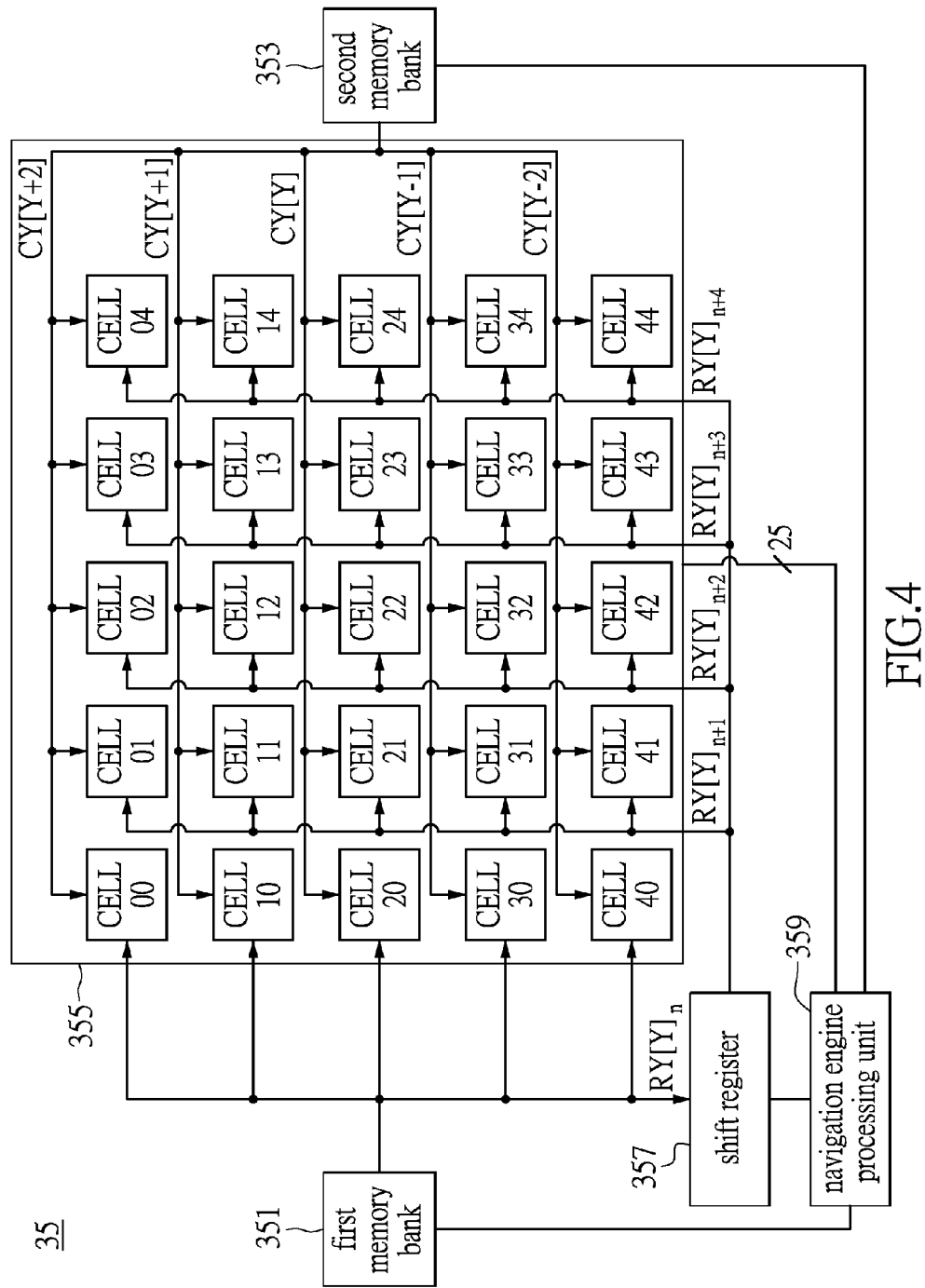
FIG. 4 is a schematic diagram of a correlation apparatus for an optical navigation device provided in accordance to an exemplary embodiment of the present disclosure.

Next, a detailed structure of correlation apparatus 35 is further provided in the present disclosure. Please refer to FIG. 4 in conjunction to FIGS. 2A and 2B, wherein FIG. 4 shows a schematic diagram illustrating a correlation apparatus for an optical navigation device provided in accordance to an exemplary embodiment of the present disclosure.

The correlation apparatus 35 includes a memory unit, a parallel cell array 355 having a plurality of cells CELL00~CELL44, a shift register 357, and a navigation engine processing unit 359. The memory unit further includes a first memory bank 351 and a second memory bank 353. The parallel cell array 355 is coupled between the first memory bank 351 and the second memory bank 353. The shift register 357 is coupled to the parallel cell array 355. The navigation engine processing unit 359 is coupled to the plurality of cells of the parallel cell array 355, the first memory bank 351, the second memory bank 353, and the shift register 357.

The first memory bank 351 is configured to store the reference array in the manner illustrated in FIG. 2A. The second memory bank 353 is configured to store the compare array in the manner illustrated in FIG. 2B. When newly input image is captured, the navigation engine processing unit 359 can determine whether to keep the first memory bank 351 unchanged and just update the compare array in the second memory bank 353 with the newly captured input image or to transform the compare array in the second memory bank 353 to the reference array while updating the first memory bank 351 with the newly captured input image.

In the instant embodiment, the parallel cell array 355 is configured according to the L×M search window e.g., 5×5 search window. The parallel cell array 355 includes 25 cells CELL00~CLEL44. Each of the cells CELL00~CLEL44 operatively receives compare pixel values indexed from the second memory bank 353 and correlating the reference pixel values tagged concurrently fed from the first memory bank 351 according to the index movement of the reference array so as to generate a correction value between the reference array and the compare array over a specific search window.

The shift register 357 operatively shifts the reference pixel values tagged in the search window from the xth column cells to the x+1th column cells so that the same reference pixel values can be directly provided to the cells of next column instead of having to be fetched again from the first memory bank, wherein x is an integer. Particularly, The shift register 357 can forward the bit stream representation of the reference pixel values delivered to the respective cells CELL00, CELL10, CELL20, CELL30, and CELL 40 over to the cells CELL01, CELL11, CELL21, CELL31, and CELL 41, the cells CELL02, CELL12, CELL22, CELL32, and CELL 42, and so on at each clock operation.

For example, the respective cells CELL00, CELL10, CELL20, CELL30, and CELL 40 receives the RP[Y], and the cells CELL01, CELL11, CELL21, CELL31, and CELL 41 receives RP[Y]n+1 during next clock operation.

It should be further noted that when only a portion of the cells falls within the peak prediction, the navigation engine processing unit 359 can operatively drive the shift register 357 to forward only the corresponding portion of the bit steam extracted to the respective column cells. The navigation engine processing unit 359 can also operative configure the memory address offsets X and Y (i.e., set a predefined index movement) to drive the first memory bank 351 and the second memory bank 353 according to the peak prediction to output the corresponding compare pixel values and reference pixel values to the plurality of cells CELL00~CELL44.

For example, suppose the L×M search window centers on the cell CELL22 (i.e., where the peak correlation value occurs previously is at center of the compare array) then the CELL22 computes the correlation value between the reference array and the compare array when the reference array completely overlaps the compare array e.g., the memory address offsets X=0 and Y=0. The computation process of the correlation value for the cell CELL20 may be implemented as follow, multiplying each compare pixel value of the compare array by the respective reference pixel value in the reference array, and summing of the multiplication results to generate the correlation value.

Similarly, the CELL31 computes the correlation value between the reference array and the compare array when the reference array has been shifted by one pixel downward to left with respect to the compare array; the CELL12 computes the correlation value between the reference array and the compare array when the reference array has been shifted by one pixel upward with respect to the compare array and so on. Those skilled in the art should be able to deduce the pixel data tagging and correlation operation of cells CELL00~CELL44 and further description is hereby omitted.

Moreover, as shown in FIG. 4, based on the arrangement of the first and second memory banks 351, 353 illustrated in FIG. 2A and FIG. 2B, the navigation engine processing unit 359 can drive the second memory bank 353 to deliver the compare pixel data of CY[Y+2], CY[Y+1], C[Y], CY[Y−1], and CY[Y−2] in form of bit stream simultaneously to the cells in the same column, e.g., CELL00, CELL10, CELL20, CELL30, and CELL40 using the memory address offset Y. That is the bit stream outputted by the second memory bank 353 can be truncated and decoded correspondingly to parallely deliver the corresponding compare pixel values to the designated cells. Such that the correlation values of CELL00, CELL10, CELL20, CELL30, and CELL40 can be computed concurrently. Similarly, the second memory bank 353 can be controlled to deliver the compare pixel data of CY[Y+2], CY[Y+1], C[Y], CY[Y−1], and CY[Y−2] in form of bit stream simultaneously to the cells CELL01, CELL11, CELL21, CELL31, CELL41 to compute the correlation values of CELL01, CELL11, CELL21, CELL31, and CELL41, and so on.

The navigation engine processing unit 359 may further generate the predefined indexing movement of the reference array over the compare array based on the location of the peak correlation value identified previously. Taking an 18×18 reference array and an 18×18 compare array as an example. If the location of the peak correlation value identified previously occurs at cell CELL11, then the navigation engine processing unit 359 is configured the predefined indexing movement based on the cell CELL11 such that search window (e.g., 5×5 search window) is centered on the cell CELL11. The cell CELL22 in this case computes the correlation value for which the reference array is shifted by one pixel downward and one pixel to the right.

Figure 5:
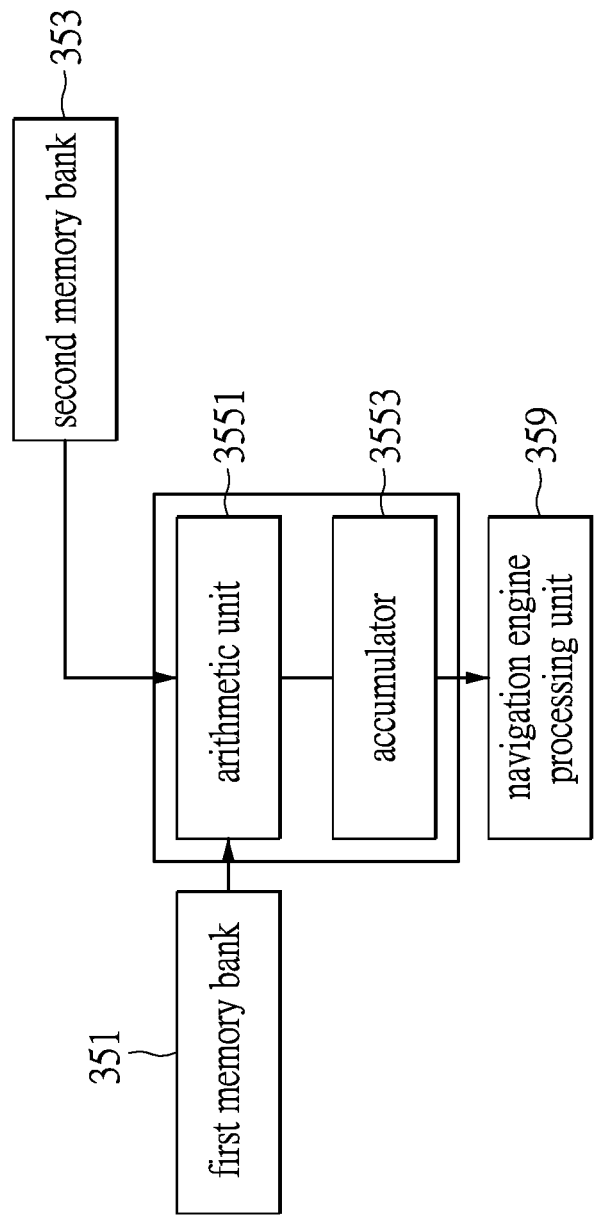
FIG. 5 is a diagram of a correlation cell in the correlation apparatus in more detail provided in accordance to an exemplary embodiment of the present disclosure.

When the navigation engine processing unit 359 compares the location of the peak correlation value presently identified and the location of the peak correlation value previously identified and found that the location of peak correlation value may occur in between two cells (e.g., cells CELL22 and CELL 31). The navigation engine processing unit 359 can utilize an interpolation method to find the actual peak location and correspondingly arrange the center of the search window with proper index movement of the reference pixel values over the compare pixel values Please refer to FIG. 5 with continuing reference to FIG. 3. FIG. 5 shows a diagram of a correlation cell in the correlation apparatus in more detail provided in accordance to an exemplary embodiment of the present disclosure.

Each cell includes an arithmetic unit 3551 and an accumulator 3553. The arithmetic unit 3551 is coupled to the first memory bank 351 and second memory bank 353 for correspondingly receiving the reference pixel values and the compare pixel values tagged to the cell. The accumulator unit 3553 is coupled to the arithmetic unit 3551 and the navigation engine processing unit 359.

The arithmetic unit 3551 computes the multiplication results between the tagged reference pixel values and the corresponding compare pixel values. Since both the reference array and the compare array are already stored in the first and the second memory banks 351, 353 i.e., the compare image data is not in streaming fashion, thus the arithmetic unit 3551 can receive the tagged reference pixel values and the corresponding compare pixel values concurrently. The arithmetic unit 3551 multiplies the tagged reference pixel values and the corresponding compare pixel values to generate the multiplication results to the accumulator unit 3553. The accumulator unit 3553 sums the multiplication results received from the arithmetic unit 3551 to generate the correlation value for the cell.

In other embodiment, the arithmetic unit 3551 can also be configured to implement functions such as absolute value of the pixelated difference between each compare pixel value of the compare array and the corresponding reference pixel array of the reference array and the square of the pixelated difference between each compare pixel value of the compare array and the corresponding reference pixel array of the reference array. Under the function of calculating pixelated difference, the lowest correlation value is used to indicate the local feature of compare array and the related displacement is computed according to the position of the lowest correlation value. The actual implementation of the arithmetic unit 3551 may depend upon specific correlation algorithm adopted and/or optical navigation operational requirement, and the present disclosure is not limited thereto.

Figure 6:
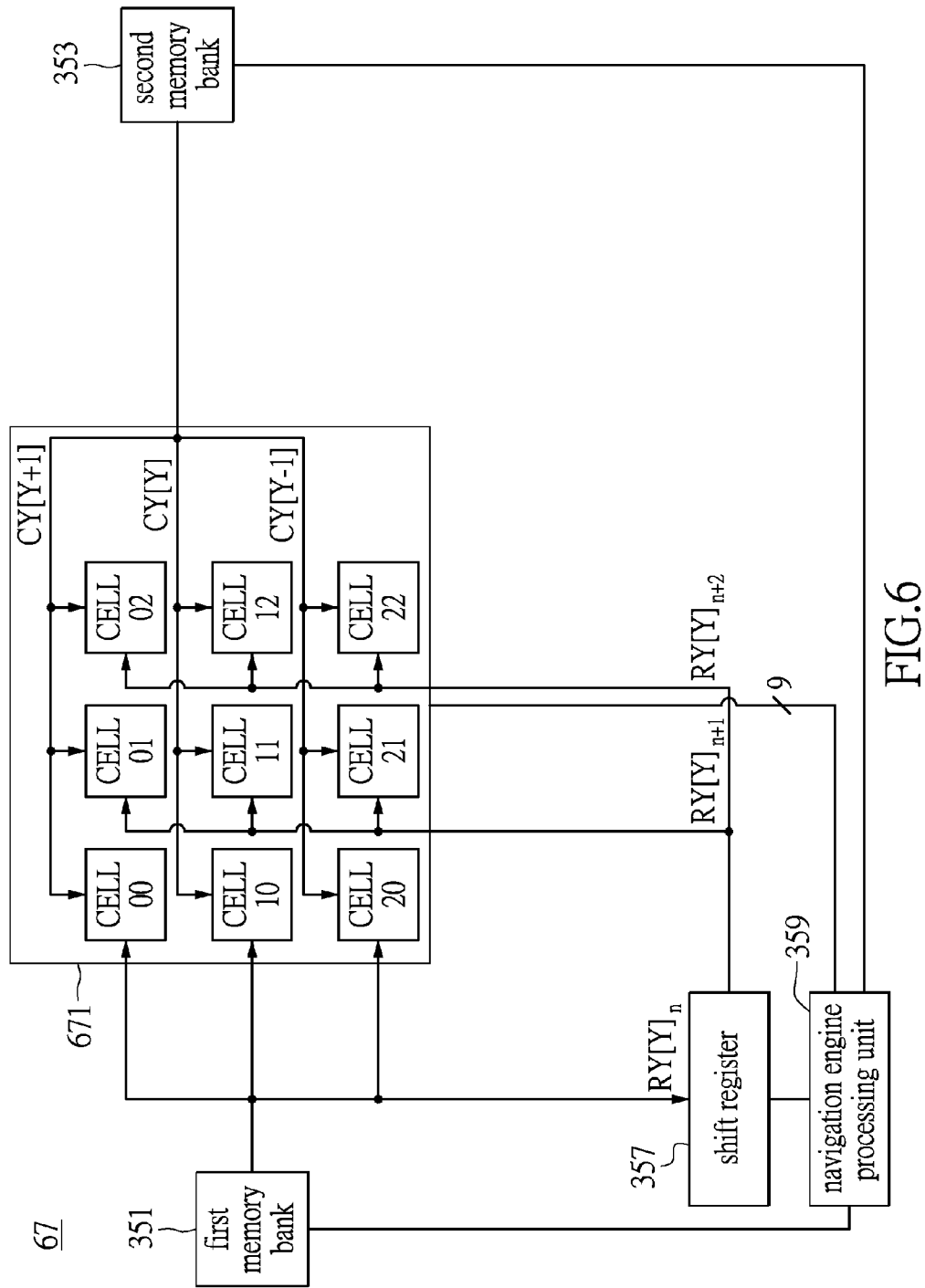
FIG. 6 is a schematic diagram of a correlation apparatus for an optical navigation device provided in accordance to another exemplary embodiment of the present disclosure.

In another embodiment, the parallel cell array 355 of the correlation apparatus 357 as previously described may be configured to have 3×3 search window as shown by the parallel cell array 671 of the correlation apparatus 67 in FIG. 6 or 7×7 search window depend upon the operational environment.

In practice, the control unit 37 and the correlation apparatus 35 may be integrated in a processing chip such as a digital signal processor or embedded microcontroller, disposed in the optical navigation device 30. The memory unit may also be a memory section of the processing chip or a volatile memory chip or a nonvolatile memory chip such as a flash memory chip, a read-only memory chip, or a random access memory chip, in which the compare pixel values of the compare array and the reference pixel values of the reference array can be indexed properly during the image correlation process.

In a conventional serial correlation architecture, the larger the search window the longer the correlation computation time required i.e., long latency occurs during each tracking operation. Whereas, in the present disclosure, the larger the search window, the less correlation computation time require as all the correlations within the search window can be computed concurrently in the parallel cell array using the column addressing method disclosed. That is, the present disclosure does not have limitations on the number of the correlation cells. Another advantage provided by the present disclosure is that column pixel data of the cells can be shifted from column to column using a shift register, and does not need a first in first out (FIFO) memory thereby not only saving time required to fetch the pixel data but also conserve the digital correlation implementation area.

Additionally, differ from prior art which computes correlation on a streaming basis, where the reference array have wait until the compare array is ready as the newly input image is filtered and correlated with the reference array at same time, the reference array and the compare array in the present disclosure, are first stored in the first and second memory banks before correlation, thus the compare pixel values and the corresponding reference pixel values are ready for correlating according to peak prediction during the correlation process thereby eliminate the delay caused by pixel data not been ready.

Further, the correlation apparatus can define a search window according to the peak prediction and directly fetch memory location associated with the tagged compare pixel values and the reference pixel values for the search window with properly indexing. Accordingly, the correlation process effectively shorten thereby enhance the tracking performance of the optical navigation device.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A parallel correlation method, adapted for an optical navigation device, the method comprising:
   a) generating a reference array corresponding to a reference image and a compare array corresponding to a first compare image captured;
   b) storing the reference array in a first memory bank in a manner that the reference pixel values of an ith column of the reference array are indexed by the ith column; storing the compare array in a second memory bank in a manner that the compare pixel values of a jth column of the compare array are indexed by the jth column; and
   c) fetching the compare pixel values from the second memory bank and the corresponding reference pixel values from the first memory bank with column indexing to simultaneously compute the correlation between the reference array and the compare array for a L×M correlation array, wherein each correlation value in the L×M correlation array corresponds to an indexing movement of the reference array over the compare array;
   wherein L, M, i, and j are integers.

2. The parallel correlation method according to claim 1, wherein the step b) further comprises:
   storing the reference pixel values of the ith column of the reference array in a memory block of the first memory bank indexed by the ith column of the reference array and storing the reference pixel values of an i+1th column of the reference array in the memory block of the first memory bank indexed by the i+1th column of the reference array; and
   storing the compare pixel values of the jth column of the compare array in a memory block of the second memory bank indexed by the jth column of the compare array and storing the compare pixel values of a j+1th column of the compare array in the memory block of the second memory bank indexed by the j+1th column of the compare array.

3. The parallel correlation method according to claim 1, further comprising
   d) fetching the compare pixel values from the second memory bank and the reference pixel values from the first memory bank to define a L×M search window, wherein the L×M search window corresponds to the indexing movement of the reference array over the compare array; and
   e) computing a correlation value for the compare pixel values and the corresponding reference pixel values tagged in the L×M search window; and f) repeating step d) and step e) to compute all the correlation values for all L× M search windows defined in the compare array to generate the L×M correlation array.

4. The parallel correlation method according to claim 3, wherein the step e) comprises:
   multiplying each compare pixel value and the corresponding reference pixel value tagged in each L×M search window; and
   summing all the multiplication results computed in each L×M search window.

5. The parallel correlation method according to claim 1, wherein the step after step c) comprises:
   g) analyzing the L×M correlation array to identify a peak correlation value thereof based on a predetermined criterion.

6. The parallel correlation method according to claim 5, wherein the step after step g), comprises:
   h) determining a displacement of the optical navigation device based on the pixel position associated with the peak correlation value identified.

7. The parallel correlation method according to claim 5, wherein after step g) comprises:
   determining whether to update the reference array;
   when determines that the reference array needs to be updated, replacing the reference array with the compare array; and
   generating the compare array corresponding to a second compare image captured, wherein the second compare image is captured after the first compare image.

8. The parallel correlation method according to claim 7, wherein the step after generating the compare array corresponding to a second compare image captured comprises:
   determining a predefined indexing movement of the reference array over the compare array based on a location of the peak correlation value previously identified for the first compare image.

9. The parallel correlation method according to claim 1, wherein the L×M correlation array is a 5×5 correlation array or a 7×7 correlation array.

10. The parallel correlation method according to claim 1, wherein the step a) comprises:
    utilizing a digital image contour filter to filter the reference image so as to generate the reference array; and
    utilizing the digital image contour filter to filter the first compare image so as to generate the compare array.

11. A correlation apparatus, comprising:
    a memory unit, having a first memory bank and a second memory bank, the first memory bank used to store a reference array corresponding to a reference image, wherein the reference pixel values of an ith column of the reference array are indexed by a ith column, and the reference array is generated by a control unit coupled to the memory unit; the second memory bank used to store a compare array corresponding to a first compare image captured, wherein the compare pixel values of a jth column of the compare array are indexed by a jth column, and the compare array is generated by the control unit;
    a parallel cell array, having a plurality of cells, coupled between the first memory bank and the second memory bank, each cell receiving the compare pixel values indexed from the second memory bank and correlating the reference pixel values tagged concurrently fed from the first memory bank to generate a correlation value, and then generating a L×M correlation array, wherein each correlation value in the L×M correlation array corresponds to an indexing movement of the reference array over the compare array; and
    an navigation engine processing unit, coupled to the parallel cell array, the first memory bank, and the second memory bank, driving the first memory bank and the second memory bank to correspondingly output the compare pixel values and the reference pixel values to the plurality of cells of the parallel cell array, and analyzing the correlation values generated for the plurality of cells of the parallel cell array so as to identify a peak correlation value based on a predetermined criterion;
    wherein L, M, i, and j are integers, respectively.

12. The correlation apparatus according to claim 11, wherein the reference pixel values of the ith column of the reference array are stored correspondingly in the first memory bank indexed by the ith column of the reference array and the reference pixel values of an i+1th column of the reference array are stored correspondingly in the first memory bank indexed by a i+1th column of the reference array.

13. The correlation apparatus according to claim 12, wherein the compare pixel values in the jth column of the compare array are stored correspondingly in the second memory bank indexed by the jth column of the compare array and the compare pixel values in a j+1th column of the compare array are stored correspondingly in the second memory bank indexed by the j+1th column of the compare array.

14. The correlation apparatus according to claim 11, further comprising:
    a shift register, coupled between the first memory bank and the plurality of cells, shifting the reference pixel values from the xth column cells to the x+1th column cells;
    wherein x is an integer.

15. The correlation apparatus according to claim 11, wherein the navigation engine processing unit determines whether to update the reference array stored in the first memory bank with the compare array stored in the second memory bank before a second compare image is captured.

16. The correlation apparatus according to claim 11, wherein each cell further comprises:
    an arithmetic unit, configured to multiply each compare pixel value and the corresponding reference pixel values fed to the cell; and
    an accumulator, coupled to arithmetic unit, configured to sum all the multiplication results of the compare pixel values and the corresponding reference pixel values received so as to generate the correlation value for the cell.

17. The correlation apparatus according to claim 11, wherein the parallel cell array is an L×M array, wherein L, and M are an integer.

18. The correlation apparatus according to claim 11, wherein the navigation engine processing unit determines a displacement of an optical navigation device based on the location of the peak correlation value identified in the compare array.

19. The correlation apparatus according to claim 18, wherein the navigation engine processing unit determines a predefined indexing movement of the reference array over the compare array based on a location of the peak correlation value previously identified.

* * * * *